Figure 1:
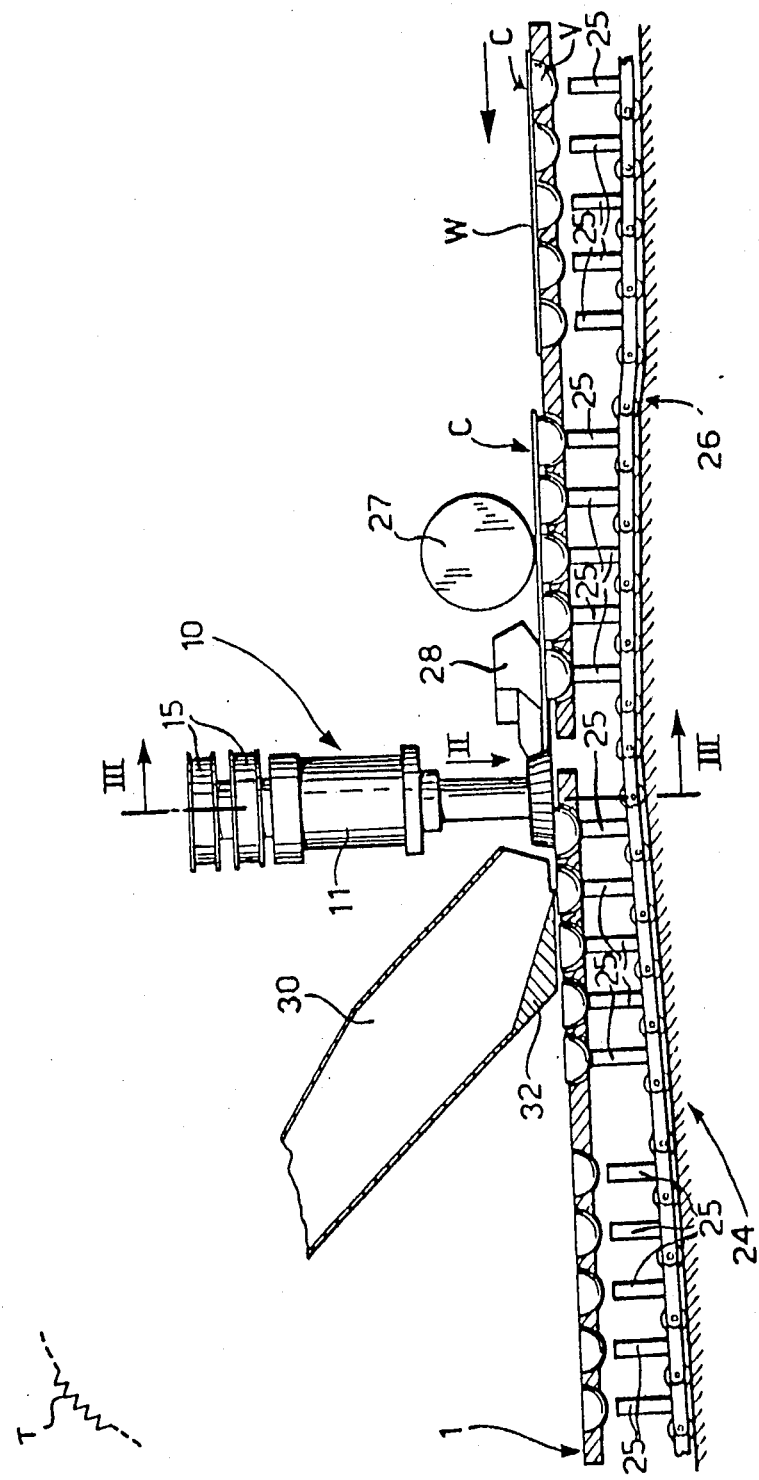

United States Patent [19]

Ferrero

[11] Patent Number: 4,770,351

[45] Date of Patent: Sep. 13, 1988

[54] APPARATUS FOR CUTTING WAFER SHELL VALVES

[75] Inventor: Pietro Ferrero, Brussels, Belgium

[73] Assignee: Ferrero S.p.A., Alba, Italy

[21] Appl. No.: 924,567

[22] Filed: Oct. 29, 1986

[30] Foreign Application Priority Data

Oct. 30, 1985 [IT] Italy ................ 67917 A/85

[51] Int. Cl.4 ............................. B02C 23/20
[52] U.S. Cl. .................... 241/60; 241/101.2; 409/137
[58] Field of Search ............ 83/872, 873, 409.2, 83/409, 409.1, 418, 666, 100; 241/101.2, 101.4, 25; 29/566.1; 409/137, 203, 217; 144/39, 218, 252 R; 82/53

[56] References Cited

U.S. PATENT DOCUMENTS

| 454,931 | 6/1891 | Heinsdorf . |
| 1,118,610 | 11/1914 | Winchester . |
| 1,448,472 | 3/1923 | Thompson . |
| 1,723,843 | 8/1929 | Chapin ............... 83/835 |
| 2,448,786 | 9/1948 | Faxon ................ 107/8 |
| 2,512,970 | 6/1950 | Rogne ................ 83/666 |
| 2,753,907 | 7/1956 | Schmidt et al. ...... 146/78 |
| 2,839,108 | 6/1958 | Retz ................ 144/118 X |
| 3,093,021 | 6/1963 | Barron .............. 83/201 |
| 3,880,215 | 4/1975 | Mallery ............. 144/39 |
| 4,002,091 | 1/1977 | White ............... 83/4 |
| 4,200,417 | 4/1980 | Hager et al. ....... 144/252 R X |
| 4,211,131 | 7/1980 | Fenn et al. ......... 83/56 |
| 4,220,065 | 9/1980 | Stanford ............ 83/873 |
| 4,300,423 | 11/1981 | Price ............... 83/165 |
| 4,382,728 | 5/1983 | Anderson et al. .... 409/137 |
| 4,388,848 | 6/1983 | Albert .............. 83/666 |
| 4,458,568 | 7/1984 | Cillario ............ 83/54 |
| 4,478,118 | 10/1984 | Lightner ........... 83/409.2 X |

FOREIGN PATENT DOCUMENTS 1215073 4/1966 Fed. Rep. of Germany ..
487018 6/1938 United Kingdom .

Primary Examiner—Frank T. Yost
Attorney, Agent, or Firm—Bernard, Rothwell & Brown

[57] ABSTRACT

In order to cut out half-shells formed in a wafer sheet in which the half-shells are interconnected by a substantially flat web, the wafer sheet is advanced against an array of disc saws the discs of which lie in a single plane parallel to the general plane of the wafer sheet and the centers of which are aligned in a direction perpendicular to the direction of advance of the wafer sheet itself.

12 Claims, 4 Drawing Sheets

APPARATUS FOR CUTTING WAFER SHELL VALVES

DESCRIPTION

Numerous sweet and confectionery products comprise a filling enclosed in a shell formed by two wafer half-shells. The shell may be of various dimensions according to the product and various shapes (for example, spherical, ovoid, bar, double-frusto-pyramidal, etc.).

In order to obtain the half-shells, a wafer sheet is first made by baking on a cellular plate having an array of cells which are identical to each other and of a shape complementary to that of the half-shells. The wafer sheet thus obtained has all the half-shells in relief on one side of the sheet itself, these being interconnected around their respective free edges by a continuous flat wall of wafer which will be termed a "web" for brevity below.

The half-shells are subsequently separated from the web by punching through the web along the free edge of each of the half-shells or, according to a solution which is the subject of Italian patent application no. 68906-A/80—in the name of the same Applicants—and of the corresponding U.S. Pat. No. 4,458,568, by a sawing operation effected parallel to the plane of the wafer sheet.

The sawing is carried out with a band saw or continuous wire saw, while the wafer sheet is supported by a cellular support which is advanced relative to the blade of the saw.

The Applicants have found that this solution is completely satisfactory—particularly with regard to the quality of the final product—but gives rise to several disadvantages when it is carried out, among which may be pointed out:

a certain instability and imprecision in the positioning of the central portion of the arm of the saw which effects the cutting action, and the need, during the cutting operation, to transfer the wafer sheet from the cellular moulds in which it is located to a cutting support adapted to the dimensions and bulk of the saw and subsequently to return the half-shells separated from the web to the cellular moulds which support them during the subsequent filling operation.

The first disadvantage, which manifests itself essentially as a vibration of the saw blade, is particularly evident during the cutting of wafer sheets of considerable width.

The second disadvantage may be due essentially to the presence of the lateral pulleys over which the band of the saw passes. The consequent need to transfer the wafer sheets before and after cutting limits the speed and efficiency of the production process.

The object of the present invention is to provide apparatus for cutting out half-shells formed in a wafer sheet in which the half-shells are connected by a flat web, including cutting means acting parallel to the general plane of the wafer sheet with a relative advance movement between the wafer sheet and the cutting means, which does not give rise to the aforesaid disadvantages.

According to the present invention, this object is achieved by apparatus of the type specified above characterised in that the cutting means include at least one disc saw.

In the embodiment preferred at present, the apparatus according to the invention includes an array of disc saws, the discs of which lie in a single plane parallel to the general plane of the wafer sheet and the centres of which are aligned in a direction perpendicular to the direction of the relative advance movement.

To advantage, the apparatus according to the invention may be associated with a device for conveying the wafer sheet which supports the sheet during its advance movement relative to the disc saws. The apparatus is then provided with lifting means which enable the wafer sheet to be raised in a controlled manner from the conveyor device and the half-shells cut from the wafer sheet itself to be gradually lowered again towards the conveying device, respectively upstream and downstream of the array of saws in the direction of advance of the wafer sheet. A guide shoe member is provided immediately upstream of the saws member and defines a surface for sliding abutment by the wafer sheet raised by the conveyor device. Immediately downstream of the saws is a device for sucking up the waste produced during the cutting operation.

Figure 2:
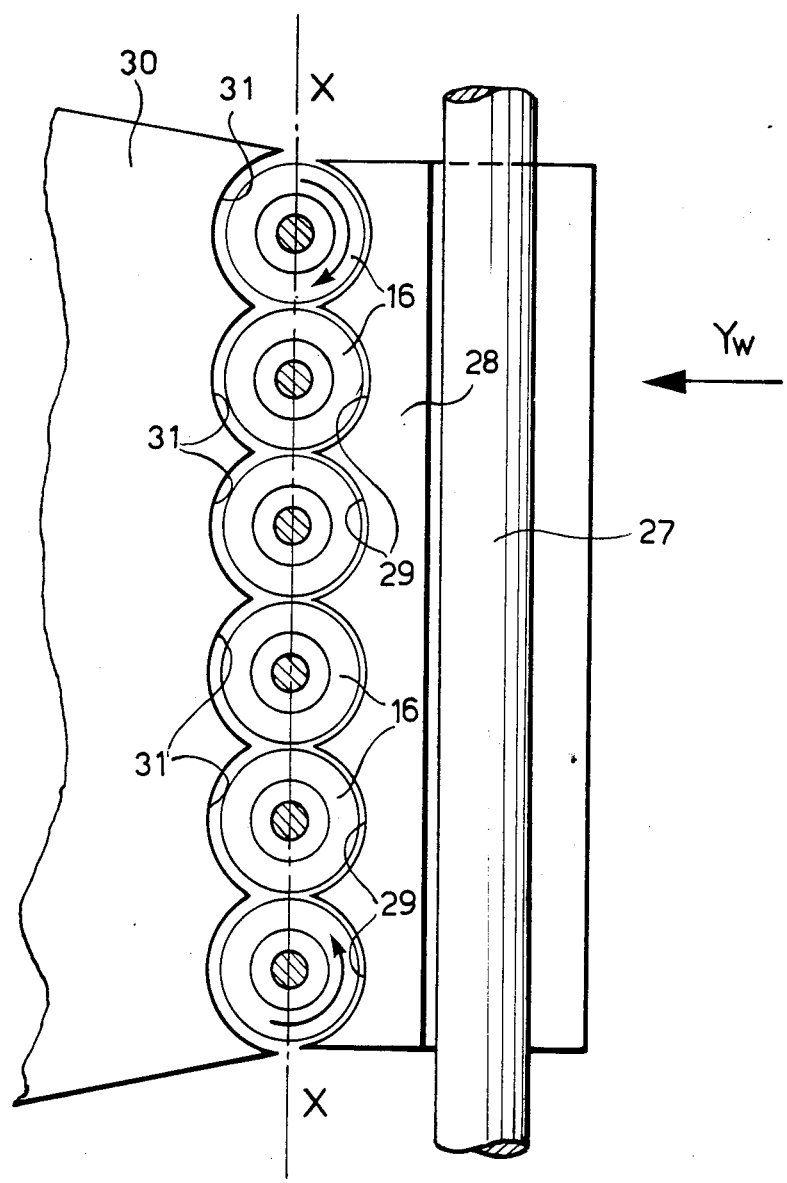
Figure 3:
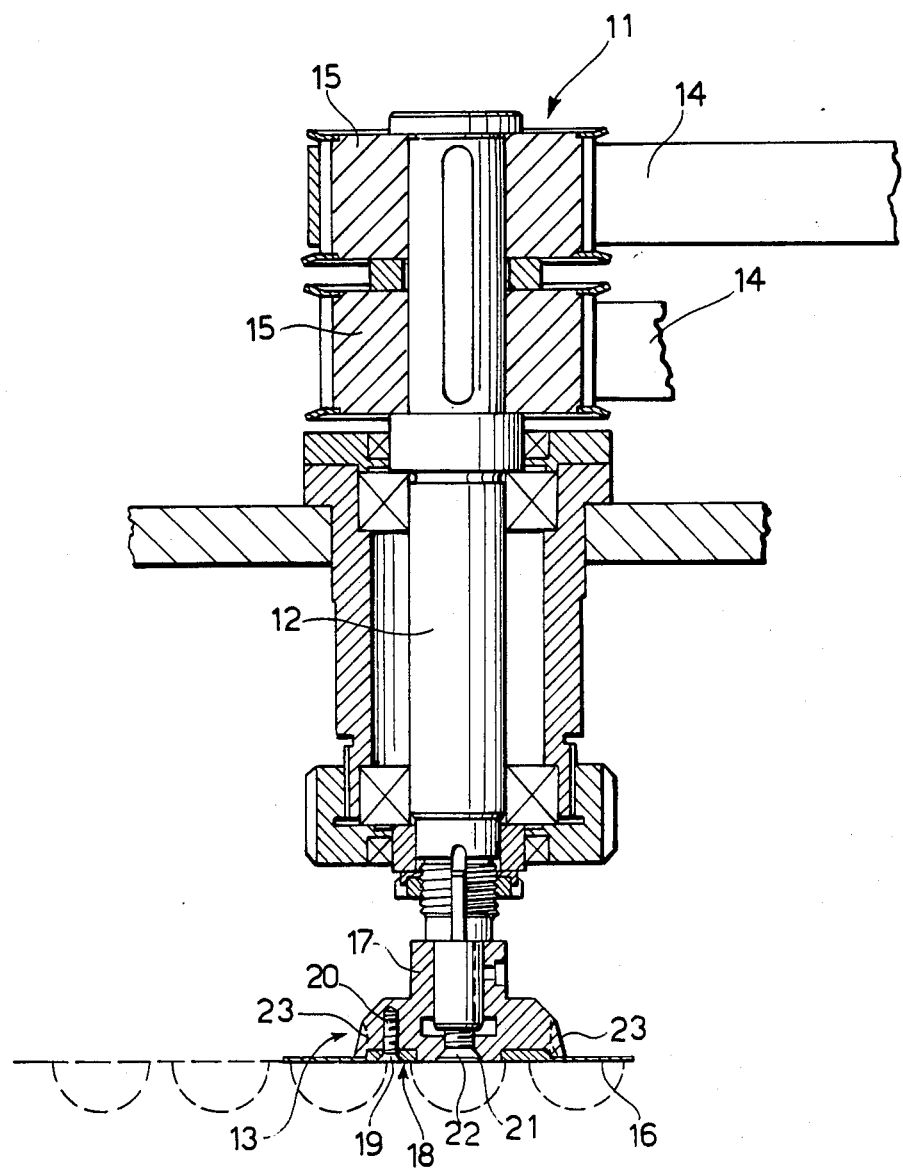
Figure 4:
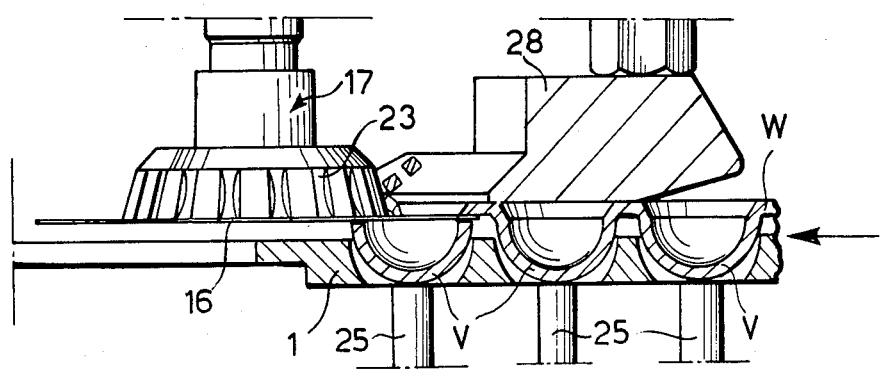
Figure 5:
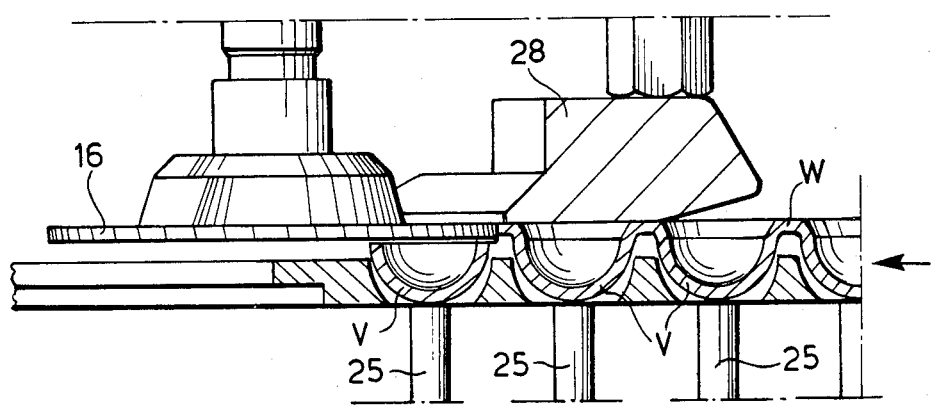

The invention will now be described purely by way of non-limiting example with reference to the appended drawings, in which:

FIG. 1 is a partially cut-away and sectioned side elevational view of apparatus according to the invention, FIG. 2 is a view taken on the arrow II of FIG. 1, FIG. 3 is a partial section taken on the arrow III—III of FIG. 1, and FIGS. 4 and 5 illustrate schematically the principle of operation of two different embodiments of the invention.

FIG. 6 schematically illustrates sawteeth having isoscelestriangle profiles.

In FIG. 1, a conveyor movable in a generally horizontal direction from right to left and constituted essentially by a continuous or semi-continuous chain of cellular moulds, such as, for example, the moulds described in Italian patent application No. 68719-A/81 in the name of the same Applicants—and in the corresponding European patent application No. 0083324, is indicated 1.

The term "cellular" is intended to indicate moulds constituted essentially by a flat plate in which generally bowl-shaped cavities are provided which are upwardly open in the arrangement of use. Moulds of this type may be used for the manufacture, from a paste of water, flour and various additives, of wafer sheets C constituted by a plurality of half-shells V of a shape complementary to that of the cells of the moulds and connected together in correspondence with their free edges by a flat continuous wall or web W.

The half-shells V are used to make sweet products in which the half-shells, after being filled with a filling, are connected together in pairs in a frontal mating position so as to form a wafer shell which encloses the filling within it.

Naturally, in order for the half-shells V to be used, it is necessary for them to be cut away from the web.

The apparatus according to the invention, generally indicated 10, is intended to achieve the separation or cutting out of the half-shells V from the wafer sheet C.

The apparatus 10 is constituted essentially by an array of disc saws 11 each having the structure illustrated in FIG. 3.

This structure can be seen to consist of a shaft 12 which is rotatable about a vertical axis (or an axis perpendicular to the direction of movement of the wafer sheet C on the conveyor device 1) and a cutting unit 13 mounted at the lower end of the shaft 12.

The shaft 12 is rotated by a motor (not illustrated) which drives a transmission system including belts 14 which pass over pulleys keyed to the shafts 12 of the saws 11 at the upper ends of the shafts themselves.

In general, as illustrated in FIG. 3, two pulleys 15 are keyed on the shaft of each saw 11 and two respective belts 14 pass around them; one of the belts 14 acts as a drive belt which receives drive from the motor or from an adjacent saw 11, while the other acts as a driven belt which transmits the movement to another saw 11.

The cutting unit 13 can be seen to include two elements, namely:
- a disc 16 having an external cutting edge with teeth T which preferably have isosceles-triangle profiles as shown schematically in FIG. 6, and
- a core 17 which acts as a support for the disc 16 and may be fixed in turn to the lower end of the shaft 12 in a general quick-release configuration.

The disc 16 is normally constituted by a steel circular-saw disc having a thickness of the order of 0.5–0.7 mm and a diameter of the order of 90–100 mm.

As will be better understood from the following description, it is also possible to use toothed discs 16 having a greater thickness, for example a thickness of several mm, corresponding to the thickness of the web W of the wafer sheet C to be cut.

Widely different choices may also be made for the diameter of the disc.

In each case, however, the diameter of the disc 16 is chosen so as to be substantially equal to a whole multiple of the diameter or transverse dimension of the half-shells V in a direction perpendicular to the direction of advance of the wafer sheet C relative to the saws 11.

This choice is intended to ensure that each wafer sheet is exposed to the action of one and only one of the discs 16.

The disc 16 is mounted on the core 17 so that the face of the disc intended to face the wafer sheets C is practically free from surface irregularities, with the core 17 located completely on the other face of the disc 16.

This result may be achieved, for example, by the formation of apertures 18 (for example, three apertures angularly spaced from each other by 120° in the angular extent of the disc 16) in the disc to act as seats for receiving the heads of screws 19, each of which is screwed into a corresponding threaded hole 20 in the core 17.

In order to mount the core 17 on the lower end of the shaft 22, the central hole 21 normally already provided in the disc 16 may be used as the hole for the passage of a screw 22 or other rapid coupling member which can be coupled with the lower end of the shaft 22 so as to ensure that the cutting unit 13 is rotated as a result of the rotation of the shaft 12 itself.

Alternatively, it is possible to provide the lower end of the shaft 12 with a chuck or sleeve which is keyed to the shaft 12 and can lock the core 17 in a configuration similar to that used in column drills.

The assembly solution described has the advantage of enabling rapid replacement of the cutting members, that is the discs 16, when they have been damaged accidentally or worn as a result of prolonged use.

In this event, the saw 11 can be raised from its working position facing the wafer sheet C to allow replacement of the cutting unit 13. It is generally more advantageous, in fact, to replace the entire cutting unit 13 by another similar unit by operating the corresponding rapid engagement members (screw 22, chuck, etc.), rather than separate the damaged or worn disc 16 from the core 17 to replace it with another new disc.

Again with reference to FIG. 3, a ring of teeth provided on the outer edge of the core 17 is generally indicated 23. The function of this ring of teeth 23 will be described more fully below.

As shown better in the plan view of FIG. 2, the discs 16 of all the saws 11 lie in a single horizontal plane with the respective centres aligned along a straight line X—X extending perpendicular to the direction of advance of the wafer sheet C, indicated by the arrow $Y_W$ in the same FIG. 2.

The function of the saws 11 is to separate the half-shells V from the web W by a sawing operation effected in correspondence with the free edges of the half-shells V themselves.

The choice of the direction of rotation of the discs 16 is generally free. The two discs 16 which occupy the end positions, that is, the outermost positions in the array, however, are preferably rotated in opposite senses selected so that the portions of the cutting edges of the two discs which attack the wafer sheet C at any moment, cutting it, move towards each other, as shown schematically by the two arrows in FIG. 2.

This choice is intended to cause the waste produced during the cutting operation by the two end discs 16 to be projected towards the interior of the apparatus 10, so as to prevent it from falling out of the apparatus, over the edges of the conveyor 1.

This waste is in fact constituted by powder or wafer fragments, that is, a material containing a certain proportion of sugar and other food additives which may be slightly corrosive and, in any case, are harmful with regard to the operation of the drive members of the conveyor 1.

In order to ensure the precision necessary for carrying out the cutting operation and avoiding damage to the half-shells V, it is necessary for the wafer sheet C to be guided firmly and precisely in its advance towards the saws 11.

For this purpose it should be noted that the situation illustrated in the right-hand part of FIG. 1 is essentially an ideal model in which the half-shells V still connected by the web W are fully and precisely housed in corresponding cells in the moulds of the conveyor 1.

In practice, even when it is in the mould used for baking it, the wafer sheet C is slightly raised from the mould itself and not precisely oriented in a horizontal plane due to the dimensional variations induced during baking of the wafer.

In the apparatus of the invention, therefore, provision is made the wafer sheet C to be raised in a controlled manner from the conveyor 11 during the cutting out of the half-shells V.

For this purpose, a lifting device 24 is provided beneath the conveyor 11 and is constituted in the example illustrated by one or more endless chains whose links carry respective pusher members in the form of rods 25 on the outer side of the loop. During the movement of the device 24—which follows the conveyor 1—the pusher members 25 are raised and lowered gradually in a path determined by a linear cam 26 located beneath the upper pass of the device 24.

More precisely, each rod 25 is able to move axially relative to a respective cell, starting from the "polar" region of the cell itself, so as to cause the controlled raising and lowering of the wafer sheet C and the half-shells V in the cells according to a path which provides for:

the uniform and controlled raising of the wafer sheet C immediately upstream of the array of saws 11, and the gradual lowering of the half-shells V cut out of the wafer sheet downstream of the saws 10.

Abutment members constituted by a roller 27 with a horizontal axis and a guide shoe member 28 are disposed upstream of the array of saws 11 in order to enable the precise vertical positioning of the wafer sheet C.

As best seen in the plan view of FIG. 2, the guide shoe member 28 (which may be supported in a resiliently yielding manner) is defined on its side facing the discs 16 of the saws 11 by arcuate outlet edges 29 each of which has a profile reproducing the profile of the outer region of the disc 16 which the edge itself faces.

By adjusting the extent of the path of movement of the rods 25 and/or the position of the guide shoe 28 relative to the plane in which the saws 11 act, it is possible to establish precisely the region of the wafer sheet in which the discs 16 act to cut the half-shells V from the web W of the wafer sheet C.

For the identification of this region, two different choices are possible, these being referred to in FIG. 4 and FIG. 5 respectively.

In a first solution referred to in FIG. 4, the saws 11 have thin discs 16 (0.5–0.7 mm thick) mounted on cores 17 provided externally with the teeth indicated 23 in FIG. 3.

In this case, the discs 16 meet the half-shells V adjacent the region of their connection to the web W without coming into substantial contact with the web W which is thus entirely to one side of the discs 16. In this manner, the half-shells V are separated from the web W, the integrity of the web W itself being preserved.

However, as a result of the general advance of the wafer sheet C, after the half-shells V have been separated, the web W hits the core 17 on which the disc 16 is mounted. As a result of the rotation of the core 17, the toothed edge 23 breaks up the web W.

The powder and wafer fragments constituting the cutting waste of the half-shells V and the breaking up of the web W are removed from the apparatus 10 by means of a suction device 30 located downstream of the array of saws 11.

According to the solution illustrated in FIG. 5, the saws 11 have toothed discs 16 which are considerably thicker than those of the discs used in the example illustrated in FIG. 4. More precisely, in the embodiment of FIG. 5, discs 16 are used which have a thickness substantially equal to the thickness of the web W, which is of the order of 3–4 mm.

In this case, the discs 16 are effectively at the same height as the web W.

In this case, the cutting units 13 mounted on the saws 11 do not effect the operations of cutting out the half-shells 3 and breaking up the web W in sequence. The toothed edge of the "thick" disc illustrated in FIG. 5 hits the web W directly, breaking it up. The breaking of the web W which acts as the element of the sheet C connecting the half-shells V means that the half-shells V themselves are separated from each other, the final result being similar to that obtained in the embodiment of FIG. 4.

In the case of the use of "thick" discs 16, the waste resulting from the breaking up of the web W is again removed by the suction device 30.

As best seen in FIG. 2, on its side facing the discs 16 of the saws 11, the suction device 30 is provided with inlet edges 31 each of which has an arcuate profile reproducing the profile of the peripheral part of the disc 16 facing it.

As its lower end facing the conveyor device 1, the suction device 30 has a profiled guide part 32 the function of which is to guide the cut out half-shells V during their lowering into the cells of the conveyor 1, preventing the half-shells V from being sucked accidentally into the device 30.

Downstream of the suction device 30, the rods 25 of the lifting device 25 are lowered to become completely disengaged from the half-shells V which are thus completely housed within the cells of the conveyor 1 and, in these conditions, can be directed to the filling station to be filled with the filling material.

Naturally, the principle of the invention remaining the same, the constructional details and forms of embodiment may be varied widely with respect to that described and illustrated, without thereby departing from the scope of the present invention.

I claim:

1. Apparatus for cutting out half-shells formed in a wafer sheet in which the half-shells are interconnected by a substantially flat web, including cutting means acting parallel to the general plane of the wafer sheet with a relative advance movement between the wafer sheet and the cutting means for cutting out half-shells having a particular diameter in a direction perpendicular to the direction of the relative advance movement, wherein the cutting means include an array of disc saws, the discs of which lie in a single plane parallel to the general plane of the wafer sheet and the centres of which are aligned in a direction substantially perpendicular to the direction of the relative advance movement, wherein the diameter of the disc of each saw is selected to be substantially equal to a whole multiple of the diameter of the half-shells.

2. Apparatus according to claim 1, wherein the discs occupying the end positions in the array are rotated in opposite senses selected so that the regions of the end discs which attack the wafer sheet at the same moment move towards each other.

3. Apparatus according to claim 1, wherein in that the disc of each saw has a thickness which is substantially less than the thickness of the web, the relative position of each saw and the wafer sheet being selected so that, in use, the disc of the saw acts in a plane adjacent the web to enable the web itself to slide on one side of the disc, and wherein the disc itself has an associated toothed core rotating with the disc and able to break up the web.

4. Apparatus according to claim 1, wherein the disc of each saw has a thickness which is not substantially less than the thickness of the web, the relative position of each saw and the wafer sheet being selected so that, in use, the disc of the saw acts in the plane of the web to cause the web to break up.

5. Apparatus according to claim 1, which can be associated, in use, with a conveyor device for the wafer sheet which supports the wafer sheet during its advance movement relative to the cutting means, wherein lifting means are provided for raising the wafer sheet in a controlled manner from the conveyor device and for gradually lowering the half-shells cut from the wafer itself towards the conveyor device, respectively upstream and downstream of the cutting means in the direction of the relative advance movement, and wherein a guide shoe member is provided immediately upstream of the cutting means and defines a surface for sliding abutment by the wafer sheet raised from the conveyor device.

6. Apparatus according to claim 5, wherein the guide shoe member has an outlet edge facing the disc of each saw and substantially coplanar therewith, having a generally arcuate profile complementary to the profile of the disc itself.

7. Apparatus according to claim 5, which can be associated with a conveyor device including movable moulds with cells each having a general bowl shape complementary to the shape of the half-shells and a respective polar region, wherein the lifting means include pusher members movable into the cells from the polar regions of the cells themselves.

8. Apparatus according to claim 1, wherein a device for sucking up the cutting waste is provided immediately downstream of the cutting means in the direction of the relative advance movement.

9. Apparatus according to claim 8, wherein the suction device has an inlet edge facing the disc of each saw and substantially coplanar therewith, having a generally arcuate profile complementary to the profile of the disc itself.

10. Apparatus according to any one of the preceding claims, wherein each disc saw includes:
a cutting unit with a central core on which the disc of the saw is mounted in an arrangement whereby the core lies entirely on one side of the disc and the opposite side of the disc is substantially free from surface irregularities, and
a rotary shaft having one end for supporting the cutting unit and having an attachment member at this end for coupling to the central core of the cutting unit.

11. Apparatus according to claim 3, wherein the central core of the cutting unit has toothed elements around its periphery for breaking up the web of the wafer sheet.

12. Apparatus according to claim 1, wherein the disc of each saw has teeth with isosceles-triangle profiles.

* * * * *